United States Patent Office 2,981,305
Patented Apr. 25, 1961

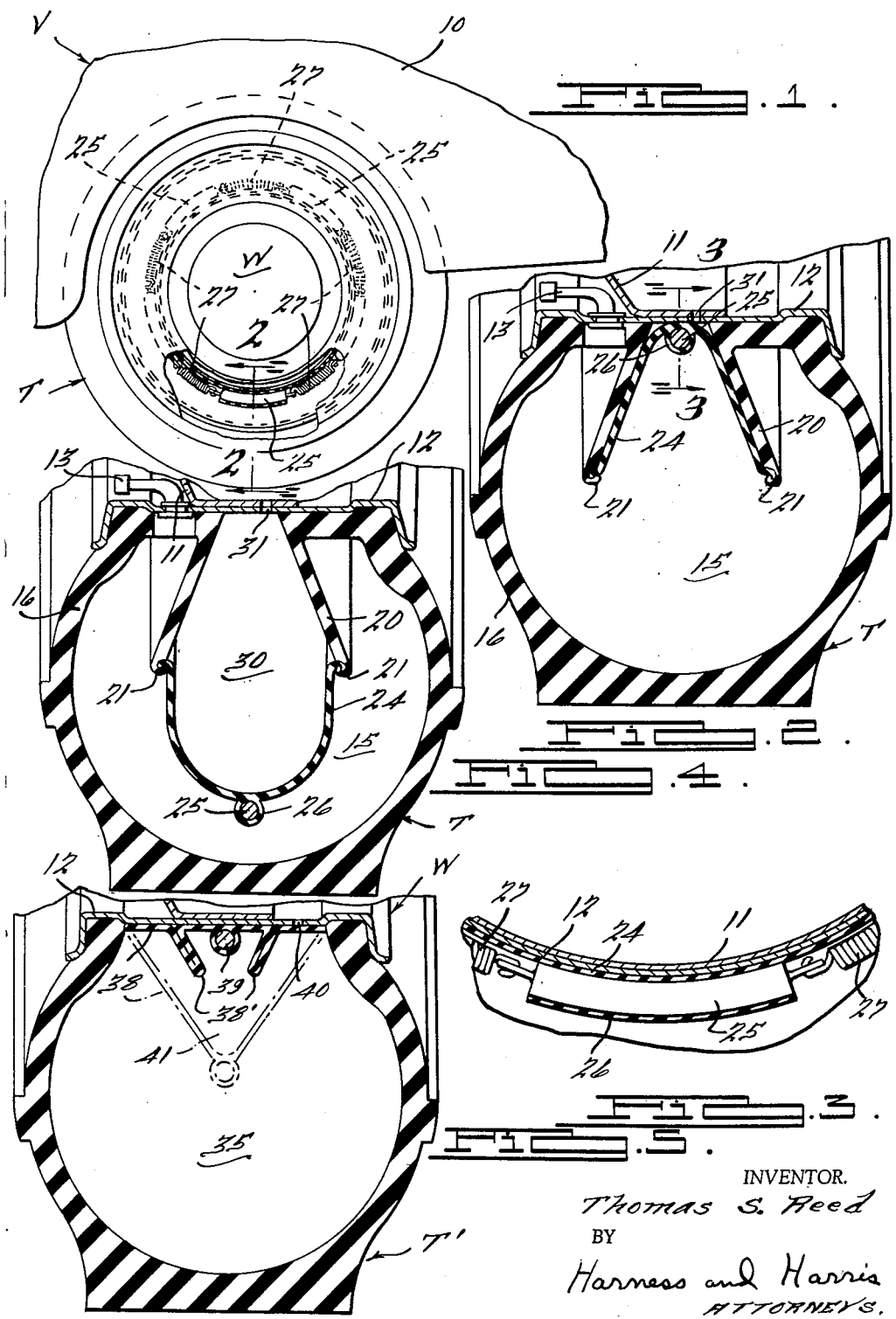

2,981,305

VARIABLE PRESSURE PNEUMATIC VEHICLE TIRE

Thomas S. Reed, Pontiac, Mich., assignor to Chrysler Corporation, Highland Park, Mich., a corporation of Delaware Filed Oct. 6, 1958, Ser. No. 765,426

11 Claims. (Cl. 152—330)

This invention relates to a pneumatic vehicle tire wherein means responsive to vehicle or wheel speed are provided to vary the inflation pressure of the tire.

It is primary object of this invention to provide a pneumatic vehicle tire having integral internal means for automatically varying the tire inflation pressure with respect to vehicle speed.

It is another object of this invention to provide a pneumatic vehicle tire having integral means arranged to vary the tire air chamber volume in response to vehicle speed to thereby automatically vary the tire inflation pressure.

It is still another object of this invention to provide a pneumatic vehicle tire with an internal diaphragm that has weight means associated therewith such that centrifugal force resulting from tire rotation will vary the air chamber volume and accordingly the tire inflation pressure.

Other objects and advantages of this invention will become readily apparent from a reading of the following description and a consideration of the related drawings wherein:

Fig. 1 is a fragmentary side elevational view, partly in section, of a vehicle wheel having a pneumatic tire embodying this invention;

Fig. 2 is an enlarged sectional elevational view taken along the line 2—2 of Fig. 1;

Fig. 3 is a fragmentary sectional elevational view taken along the line 3—3 of Fig. 2;

Fig. 4 is a sectional elevational view similar to Fig. 2, but showing the tire inflation pressure controlling mechanism operating under the influence of centrifugal force due to increased wheel rotational speed; and Fig. 5 is an enlarged sectional elevational view, similar to Fig. 2, showing a modified form of this invention.

Fig. 1 of the drawings shows a portion of a vehicle V that includes a fender 10 and a road wheel W. Wheel W includes a web portion 11 (see Figs. 2 and 4) and a rim portion 12 which latter portion seats a pneumatic tubeless tire T. Wheel rim 12 has an opening therein to receive an air valve 13 to permit control of the air supply to the internal air chamber 15 of the tire T. Mounted within and formed integrally with the casing 16 of the tire T is a substantially V-shaped, circumferentially extending, radially inwardly opening, relatively rigid, diaphragm supporting channel 20. Channel 20 can be of the tire casing material or of some other relatively rigid material. Connected to the free edges 21 of the channel 20 by suitable leakproof connections is a flexible, air impervious diaphragm 24. Diaphragm 24 is of sufficient size to line the interior wall surface of the channel 20 and it is shown as being made of a rubber-like material, such as conventional inner tube material, although other impervious lightweight flexible materials could obviously be used.

Mounted on the diaphragm 24 are a group of spaced weights 25. In the instance shown the weights 25 are seated in pockets 26 in the diaphragm 24 although the weights 25 could be connected to the diaphragm 24 by any type of connection such as cementing, mechanical fasteners, or the like. Extending circumferentially between the spaced weights are tension-type resilient springs 27. The springs 27 tend to retain the diaphragm in a collapsed condition against the interior walls of the channel 20. While springs 27 have been shown connecting the weights 25, still, springs or equivalent means are not a necessary part of this invention because the tire inflation pressure within the air chamber 15 will exert a force on the diaphragm 24 that will normally tend to collapse it against the channel 20. The use of springs 27, or equivalent means, will permit better control of the operation of this mechanism under the influence of tire rotation.

Operation of this automatic pressure regulating mechanism for tire inflation control is thought to be more or less obvious. The tire T is normally inflated while at rest to the desired, relatively low pressure that will give a so-called city or boulevard cushioned ride. At this time the diaphragm 24 will be in the position shown in Fig. 2, and both air pressure in chamber 15 and the springs 27 will tend to hold the diaphragm 24 in the collapsed position shown. As the vehicle speed is increased, as when traveling at relatively high speeds on thruways, expressways, or on rural roads, centrifugal force acting on the weights 25 will urge the weights 25 and the attached diaphragm 24 radially outwardly to a position such as that shown in Fig. 4. As the diaphragm 24 is moved radially outwardly under the influence of centrifugal force from its collapsed position of Fig. 2, the effective volume of the air chamber 15 of the tire T is materially reduced and accordingly the pressure of the air trapped in chamber 15 will be increased. Increased tire inflation pressure is desired at increased vehicle speeds as it improves handling, reduces tire wear, gives better fuel economy and better passenger ride. The reduction in effective volume of the tire air chamber 15 resulting from operation of this invention is equal to the volume of the chamber 30 shown in Fig. 4. When wheel or vehicle speed is reduced the reduction in centrifugal force applied to weights 25 and the effect of springs 27, as well as the air pressure in chamber 15 all combined to return the diaphragm 24 to the collapsed position shown in Fig. 2. It will be noted that the wheel rim portion 12 is provided with a bleed vent 31 so that the air sucked into the diaphragm chamber 30 during expansion of the diaphragm 24 can be evacuated from chamber 30 when diaphragm 30 is being collapsed.

Fig. 5 shows a modified form of the invention shown in Figs. 1–4. In the Fig. 5 form of the invention, a conventional tire casing T' having an air chamber 35 is shown mounted on rim 12 of a conventional wheel W. The air chamber 35 is adapted to be filled through a valve mechanism (not shown) similar to the valve 13 shown in Figs. 2 and 4. A diaphragm element 38, adapted to normally encircle and seat upon the wheel rim 12, is provided with integral weight means 39 that are spaced circumferentially about the rim 12. Diaphragm 38 may be fixed to the tire casing T' at its edges or it may be a separate element. Diaphragm 38 is provided with circumferentially extending pleats 38' so that it can be collapsed on the rim 12 or expanded, under the influence of centrifugal force acting on the weights 39, to the condition shown in broken lines in Fig. 5. The resilience of the diaphragm material and the air pressure within the casing air chamber 35 cooperate to return the expanded diaphragm 38 to its collapsed position on the rim 12 when vehicle or wheel speed is reduced. The rim 12 has a bleed vent 40 to permit evacuation of the air from the diaphragm chamber 41 when the diaphragm 38 is being collapsed. While no springs, such as springs 27, have been shown connecting the weights 39 of the Fig. 5 form of the invention, still, it is obvious that springs 27 or equivalent means, could be used with this form of the invention if it should be desired to have the benefits thereof. However, springs are not a necessary part of this invention in its broader aspects.

The many advantages of this invention are thought to be readily apparent from the foregoing description. First, an automatic tire inflation pressure regulating mechanism has been provided that is located completely interiorly of the tire casing 16 so that sealed connections to an outside air source are unnecessary. Second, a substantially conventional tire casing 16 is used with a conventional wheel assembly W and the diaphragm mechanism 24 that is required to be added to the tire casing 16 to provide this invention is of simple, low-cost, foolproof construction. Furthermore, the diaphragm unit 24 is of such a design that it lends itself to production by the tire manufacturer so that the tire casing 16 with its automatic pressure regulating control 24 can each be manufactured and supplied by the same source. Third, the operation of this tire air pressure control device is such that a relatively soft, super-cushion tire will be automatically provided for city or boulevard ride and for low speed travel over rough roads while a relatively high pressure, low friction, high fuel economy, good roadability tire is provided for high speed driving on expressways or in rural areas or the like. Fourth, the use of springs 27 and the size and shape of the diaphragm 24 provide a readily adjustable means for adjusting the tire pressure build-up with respect to vehicle speed so as to meet any desired pressure curve. Fifth, while a variable tire inflation pressure is provided that is directly responsive to wheel speed this invention accomplishes automatic pressure control without the use of valve mechanisms and air supply means that are costly and complicated and furthermore the diaphragm mechanism is relatively light and of such a symmetrical design that there is slight chance of causing wheel unbalance when this invention is used.

I claim:

1. In combination with a pneumatic tire casing having an interior pressurized air chamber extending circumferentially thereof, a flexible diaphragm arranged radially inwardly of and extending circumferentially about said casing air chamber and adapted to be expanded radially outwardly into said casing air chamber, weight means engaged with said diaphragm and automatically actuable under the influence of centrifugal force during rotation of the casing at normal vehicle road speeds to expand said diaphragm radially outwardly into said casing air chamber to reduce the effective volume thereof, and valve means connected to the casing air chamber to provide for air supply thereto.

2. In combination with a pneumatic tire casing having an interior pressurized air chamber extending circumferentially thereof, a flexible diaphragm arranged radially inwardly of and extending circumferentially about said casing air chamber and adapted to be expanded radially outwardly into said casing air chamber, weight means engaged with said diaphragm and automatically actuable under the influence of centrifugal force during rotation of the casing at normal vehicle road speeds to expand said diaphragm radially outwardly into said casing air chamber to reduce the effective volume thereof, and resilient means resisting expansion of said diaphragm under the influence of centrifugal force.

3. In combination with a pneumatic tire casing having an interior pressurized air chamber extending circumferentially thereof, a flexible diaphragm arranged radially inwardly of and extending circumferentially about said casing air chamber and adapted to be expanded radially outwardly into said casing air chamber, and weight means connected to said diaphragm and spaced circumferentially thereabout and automatically actuable by centrifugal force during rotation of the casing at normal vehicle road speeds to expand said diaphragm radially outwardly into said casing air chamber to reduce the effective volume thereof in response to increase in tire rotation speed.

4. In combination with a pneumatic tire casing having an interior air chamber extending circumferentially thereof, a flexible diaphragm connected to said casing and arranged radially inwardly of and extending circumferentially about said casing air chamber and adapted to be expanded radially outwardly into said casing air chamber, weight means connected to said diaphragm and spaced circumferentially thereabout and actuable by centrifugal force to expand said diaphragm radially outwardly into said casing air chamber to reduce the effective volume thereof in response to increase in tire rotational speed, and resilient means connected to said weight means resisting actuation thereof by centrifugal force.

5. In combination with a pneumatic tire casing having an interior air chamber extending circumferentially thereof, a flexible diaphragm connected to said casing and arranged radially inwardly of and extending circumferentially about said casing air chamber and adapted to be expanded radially outwardly into said casing air chamber, weight means connected to said diaphragm and spaced circumferentially thereabout and actuable by centrifugal force to expand said diaphragm radially outwardly into said casing air chamber to reduce the effective volume thereof in response to increase in tire rotational speed, resilient means connected to said weight means resisting actuation thereof by centrifugal force, and valve means connected to the casing air chamber to provide for air supply thereto.

6. In combination with a pneumatic tire casing having an interior air chamber extending circumferentially thereof, a circumferentially extending, radially outwardly opening, relatively rigid hcannel connected to the inner periphery of said casing, a flexible diaphragm mounted on said channel arranged to engage the inner, opposed, side walls thereof and adapted to be expanded radially outwardly into said casing air chamber, and weight means connected to and spaced circumferentially about said diaphragm and actuable under the influence of centrifugal force to expand said diaphragm radially outwardly into said casing air chamber to reduce the effective volume thereof.

7. In combination with a pneumatic tire casing having an interior air chamber extending circumferentially thereof, a circumferentially extending, radially outwardly opening, relatively rigid channel connected to the inner periphery of said casing, a flexible diaphragm mounted on said channel arranged to engage the inner, opposed, side walls thereof and adapted to be expanded radially outwardly into said casing air chamber, weight means connected to and spaced circumferentially about said diaphragm and actuable under the influence of centrifugal force to expand said diaphragm radially outwardly into said casing air chamber to reduce the effective volume thereof, and resilient means extending between and interconnecting said weight means and resisting actuation thereof by centrifugal force.

8. In combination with a pneumatic tire casing having an interior pressurized air chamber extending circumferentially thereof, a flexible diaphragm arranged radially inwardly of and extending circumferentially about said casing, said diaphragm having circumferentially extending pleats and adapted to be expanded radially outwardly into said casing air chamber, and weight means connected to said diaphragm and spaced circumferentially thereabout and automatically actuable by centrifugal force during rotation of the casing at normal vehicle road speeds to expand said diaphragm radially outwardly into said casing air chamber to reduce the effective volume thereof in response to increase in tire rotational speed, said diaphragm including resilient means to normally oppose radial expansion of the diaphragm by the centrifugal force effect of said weight means.

9. In combination, a wheel having a rim portion with an air bleed vent therethrough, a pneumatic tire casing sealingly mounted on and extending concentrically about said rim portion to define an air chamber therebetween, a flexible, air impervious, expandible diaphragm mounted on said tire casing adjacent said rim portion and adapted to be expanded radially outwardly into said air chamber, and weight means connected to said diaphragm and actuable by centrifugal force to expand said diaphragm radially outwardly to reduce the effective volume of said air chamber in response to increase in wheel rotational speed.

10. In combination, a wheel having a rim portion with an air bleed vent therethrough, a pneumatic tire casing sealingly mounted on and extending concentrically about said rim portion to define an air chamber therebetween, a flexible, air impervious, expandible diaphragm mounted on said tire casing adjacent said rim portion and adapted to be expanded radially outwardly into said air chamber, weight means connected to said diaphragm and actuable by centrifugal force to expand said diaphragm radially outwardly to reduce the effective volume of said air chamber in response to increase in wheel rotational speed, and valve means in said rim portion to provide for air supply to said air chamber.

11. In combination, a wheel having a rim portion with an air bleed vent therethrough, a pneumatic tire casing sealingly mounted on and extending concentrically about said rim portion to define an air chamber therebetween, a flexible, air impervious, expandible diaphragm mounted on said rim portion and adapted to be expanded radially outwardly into said air chamber, and weight means connected to said diaphragm and actuable by centrifugal force to expand said diaphragm radially outwardly to reduce the effective volume of said air chamber in response to increase in wheel rotational speed.

References Cited in the file of this patent

UNITED STATES PATENTS

| | | |
|---|---|---|
| 487,874 | Elliott | Dec. 13, 1892 |
| 2,864,424 | Thoms | Dec. 16, 1958 |